United States Patent
Ito

(10) Patent No.: US 12,386,366 B2
(45) Date of Patent: Aug. 12, 2025

(54) REMOTE SUPPORT SYSTEM

(71) Applicant: TOYOTA JIDOSHA KABUSHIKI KAISHA, Toyota (JP)

(72) Inventor: Ruiko Ito, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/529,004

(22) Filed: Dec. 5, 2023

(65) Prior Publication Data

US 2024/0264602 A1 Aug. 8, 2024

(30) Foreign Application Priority Data

Feb. 6, 2023 (JP) ................. 2023-016303

(51) Int. Cl.
| | |
|---|---|
| *G05D 1/222* | (2024.01) |
| *G05D 1/227* | (2024.01) |
| *G05D 1/69* | (2024.01) |
| *G05D 105/70* | (2024.01) |
| *G05D 109/10* | (2024.01) |

(52) U.S. Cl.
CPC ........... *G05D 1/222* (2024.01); *G05D 1/2279* (2024.01); *G05D 1/69* (2024.01); *G05D 2105/70* (2024.01); *G05D 2109/10* (2024.01)

(58) Field of Classification Search
CPC ...... G05D 1/222; G05D 1/69; G05D 2105/70; G05D 2109/10; G05D 1/2279; G05D 2105/22; G05D 2107/13; B60W 2540/221
See application file for complete search history.

(56) References Cited

U.S. PATENT DOCUMENTS

| | | | |
|---|---|---|---|
| 11,215,982 B2 | 1/2022 | Urano et al. | |
| 11,325,618 B2 | 5/2022 | Umeda | |
| 2019/0137999 A1 | 5/2019 | Taguchi et al. | |
| 2020/0209888 A1 | 7/2020 | Sakai et al. | |
| 2020/0326702 A1 | 10/2020 | Iwamoto et al. | |
| 2021/0016797 A1* | 1/2021 | Yokota | G05D 1/0061 |
| 2021/0018908 A1 | 1/2021 | Tokuda et al. | |
| 2021/0041894 A1 | 2/2021 | Urano et al. | |
| 2021/0055741 A1 | 2/2021 | Kawanai et al. | |
| 2021/0058173 A1 | 2/2021 | Otaki et al. | |
| 2021/0072743 A1 | 3/2021 | Otaki et al. | |
| 2021/0080943 A1 | 3/2021 | Iwamoto et al. | |
| 2024/0036571 A1* | 2/2024 | Goldman | G06Q 10/063114 |

FOREIGN PATENT DOCUMENTS

JP 2021-017109 A 2/2021

\* cited by examiner

*Primary Examiner* — Kito R Robinson
*Assistant Examiner* — Alexander V Gentile
(74) *Attorney, Agent, or Firm* — SoraIP, Inc.

(57) ABSTRACT

A remote support system is a remote support system for one remote operator to remotely support a plurality of mobile objects. The remote support system includes a situation acquisition unit, a support difficulty level calculation unit, and a notification unit. The status acquisition unit acquires the work status of the remote operator based on information transmitted from an operator interface operated by the remote operator. The assistance difficulty level calculation unit calculates the assistance difficulty level of the remote operator based on the work status of the remote operator. The notification unit notifies the mobile objects of the assistance difficulty level.

5 Claims, 7 Drawing Sheets

REMOTE SUPPORT SYSTEM

CROSS-REFERENCE TO RELATED APPLICATION

This application claims priority to Japanese Patent Application No. 2023-016303 filed on Feb. 6, 2023, incorporated herein by reference in its entirety.

BACKGROUND

1. Technical Field

The present disclosure relates to a remote assistance system.

2. Description of Related Art

Conventionally, Japanese Unexamined Patent Application Publication No. 2021-17109 (JP 2021-17109 A) is known as a technical document related to a remote support system. JP 2021-17109 A discloses a technique for switching to an autonomous driving mode when it is difficult for a remote driver to perform a driving operation on a mobile object such as a vehicle.

SUMMARY

In the related art described above, it is unclear whether the mobile object side recognizes whether it is difficult to perform the remote support for the mobile object.

An object of the present disclosure is to provide a remote support system that allows a mobile object side to recognize the level of support difficulty.

The remote support system of the present disclosure is a remote support system with which one remote operator provides remote support for a plurality of mobile objects, and the remote support system includes: a status acquisition unit that acquires a work status of the remote operator based on information transmitted from an operator interface operated by the remote operator; a support difficulty level calculation unit that calculates a support difficulty level of the remote operator based on the work status; and a notification unit that notifies the mobile objects of the support difficulty level.

According to the present disclosure, it is possible to provide a remote support system that allows a mobile object side to recognize the level of support difficulty.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings.

Figure 1:
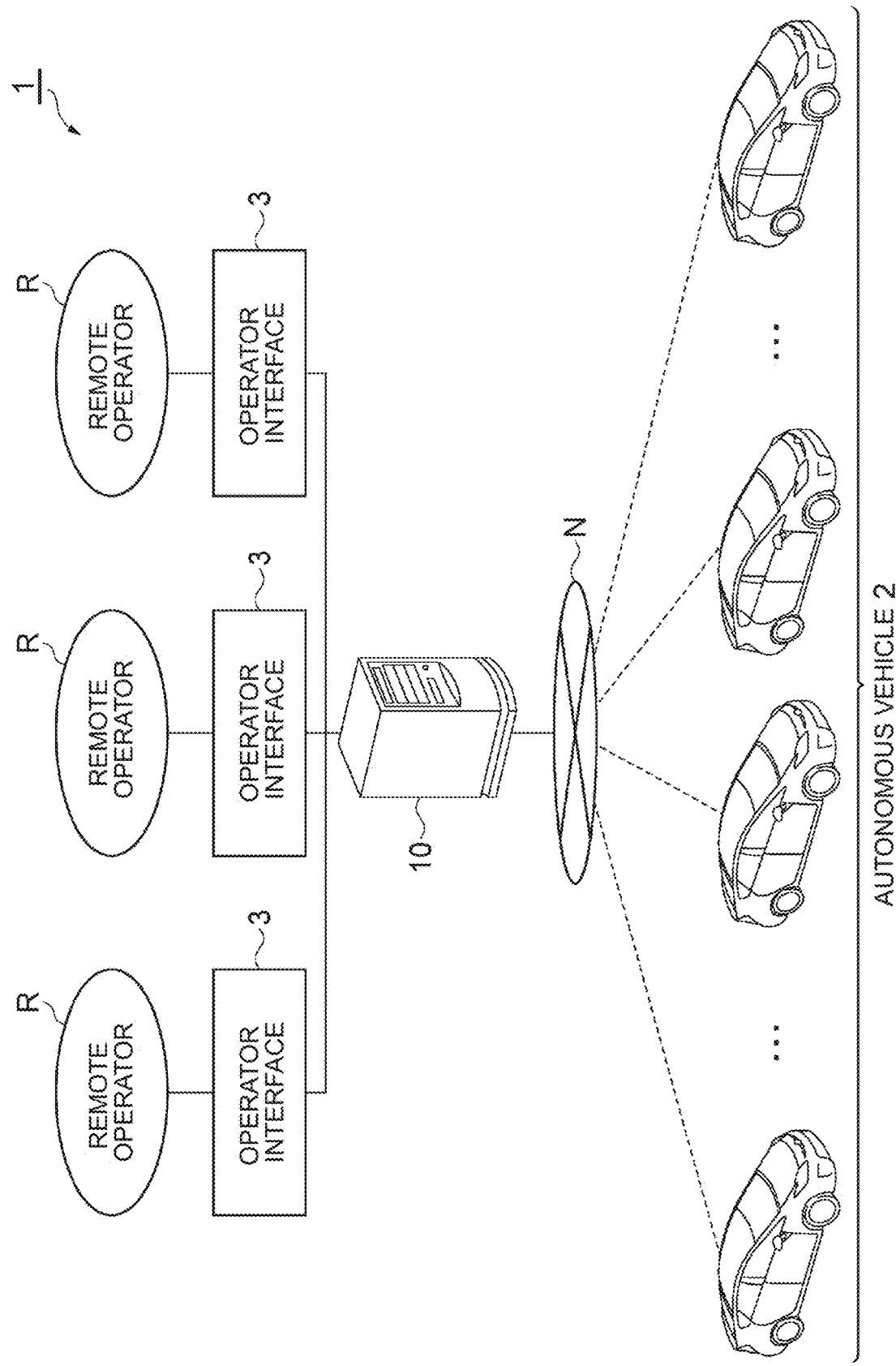
FIG. 1 is a diagram for explaining a remote support system according to one embodiment.

FIG. 1 is a diagram for explaining a remote support system according to one embodiment. A remote support system 1 shown in FIG. 1 is a system for a remote operator R to provide remote assistance to a mobile object 2 in response to a remote assistance request from the mobile object 2.

The mobile object 2 is, for example, an automatic driving vehicle. In this embodiment, the mobile object 2 is a passenger car. The mobile object 2 automatically travels. The mobile object 2 travels according to the remote support by the remote operator R when automatic travel is not safe. The mobile object 2 may travel according to the operation of the driver when automatic travel is not safe. A case where automatic driving is not safe is, for example, a case where the mobile object 2 is located in a relatively complicated environment. A relatively complex environment is, for example, an intersection with pedestrians.

A remote operator R is a person who performs remote support for the mobile object 2. The number of remote operators R is not limited, and may be one or two or more. The number of mobile objects 2 that can communicate with the remote support system 1 is also not particularly limited. In this embodiment, one remote operator R provides remote support for a plurality of mobile objects 2. That is, one remote operator R is assigned a plurality of mobile objects 2. A plurality of remote operators R may provide remote support for one mobile object 2. That is, a plurality of remote operators R may be assigned to one mobile object 2. The following description focuses on one mobile object 2 (remote support target) among the plurality of mobile objects 2. Hereinafter, the remote operator R refers to a person in charge of remote support for the mobile object 2 to be remotely supported.

The remote support is notification (transmission) of proposals by the remote operator R regarding traveling of the mobile object 2, and the like. The remote support includes, for example, a proposal to advance or stop the mobile object 2, a proposal to accelerate or decelerate the mobile object 2, a proposal to change the route of the mobile object 2, or the like. Remote assistance may be so-called remote operation. The remote operator R may operate the mobile object 2 instead of the operator of the mobile object 2.

Figure 2:
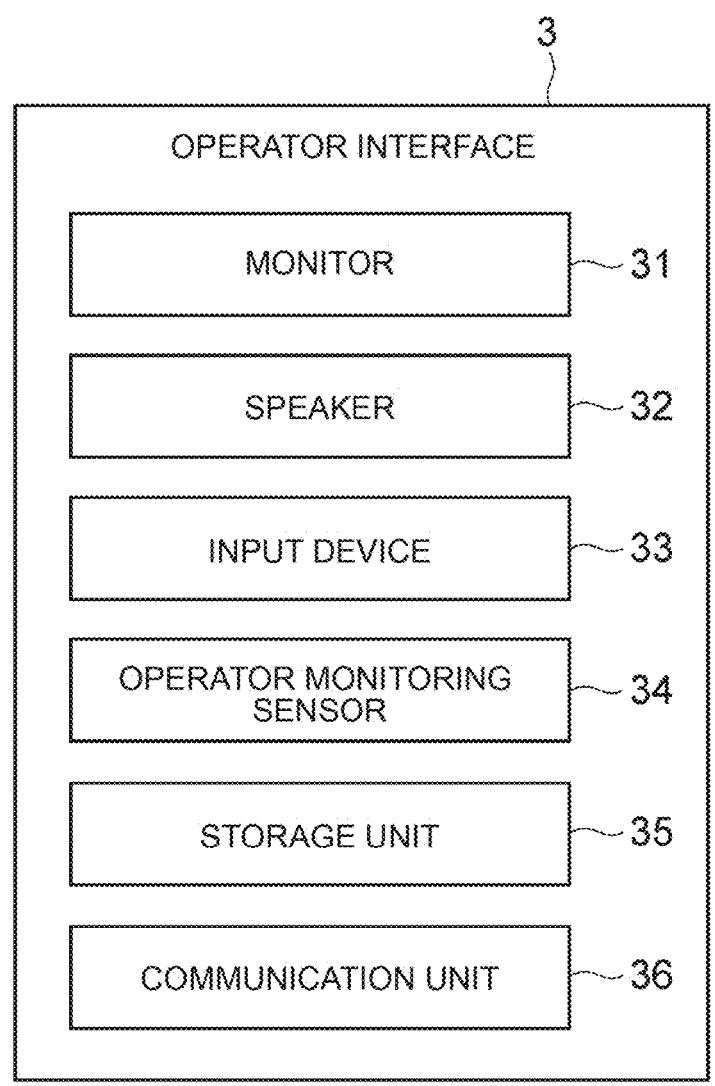
FIG. 2 is a block diagram of the hardware configuration of the operator interface shown in FIG. 1.

A remote support system 1 includes a plurality of operator interfaces 3 and a remote support server 10. The operator interface 3 is an interface used by the remote operator R to remotely support the mobile object 2. The operator interface 3 is operated by a remote operator R. FIG. 2 is a block diagram of the hardware configuration of the operator interface 3. As shown in FIG. 2, the operator interface 3 has a monitor 31, a speaker 32, an input device 33, an operator monitoring sensor 34, a storage unit 35 and a communication unit 36.

The monitor 31 and the speaker 32 are devices for presenting various information related to remote support for the mobile object 2 to the remote operator R based on instructions from the remote support server 10. The monitor 31 presents at least sensor information from an external sensor of the mobile object 2. The monitor 31 can display (present) an image of a camera of an external sensor mounted on the mobile object 2, for example.

The input device 33 is a device with which the remote operator R inputs remote support for the mobile object 2. In other words, the input device 33 receives an input for remote assistance from the remote operator R. The input device 33 includes, for example, hardware such as buttons, switches, and touch panels, or a keyboard, mouse, and the like for input via a computer. The remote operator R inputs, for example, "approval of action", "departure instruction", "right turn or left turn instruction", "route change instruction", and "numerical instruction of speed/acceleration/deceleration amount" to the input device 33. The remote operator R can use the input device 33 to input whether the recognition result of the external environment recognized by the mobile object 2 is correct or incorrect, or to instruct correction. The remote operator R inputs the number of supported mobile objects 2 assigned to the remote operator R into the input device 33.

The operator monitoring sensor 34 detects the remote operator R's biological information. The operator monitoring sensor 34 has, for example, an operator monitoring camera, a wearable device, and the like. The operator monitoring camera takes an image of the remote operator R's face, for example. The wearable device is, for example, a wristwatch-type wearable device or an eyeglass-type wearable device. The wearable device detects, for example, remote operator R's electrocardiogram information and body temperature.

The storage unit 35 includes at least one of memory and storage. The memory is a recording medium such as Read Only Memory (ROM) and Random Access Memory (RAM). A storage is a recording medium such as a Hard Disk Drive (HDD). The storage unit 35 stores the work history of the remote operator R using the input device 33. The work history includes remote support information indicating remote support input to the input device 33, and the like. The storage unit 35 stores the number of supported mobile objects 2 assigned to the remote operator R. The storage unit 35 records detection results of the operator monitoring sensor 34.

The communication unit 36 is a device that communicates with the remote support server 10. The communication unit 36 receives information presented by the monitor 31 and the speaker 32 from the remote support server 10. The communication unit 36 transmits various information stored in the storage unit 35 to the remote support server 10. Specifically, the communication unit 36 transmits to the remote support server 10 the work history of the remote operator R, the number of supported mobile objects 2 assigned to the remote operator R, and the detection result of the operator monitoring sensor 34.

The remote support server 10 shown in FIG. 1 is an electronic control unit having a Central Processing Unit (CPU) and a memory such as Read Only Memory (ROM) or Random Access Memory. In the remote support server 10, for example, various functions are realized by executing a program stored in the storage unit with the CPU. The remote support server 10 may consist of a plurality of electronic units. The remote support server 10 communicates with the mobile object 2 via the network N. Note that the remote support server 10 may be provided in a facility away from the mobile object 2 or may be mounted on the mobile object 2.

Figure 3:
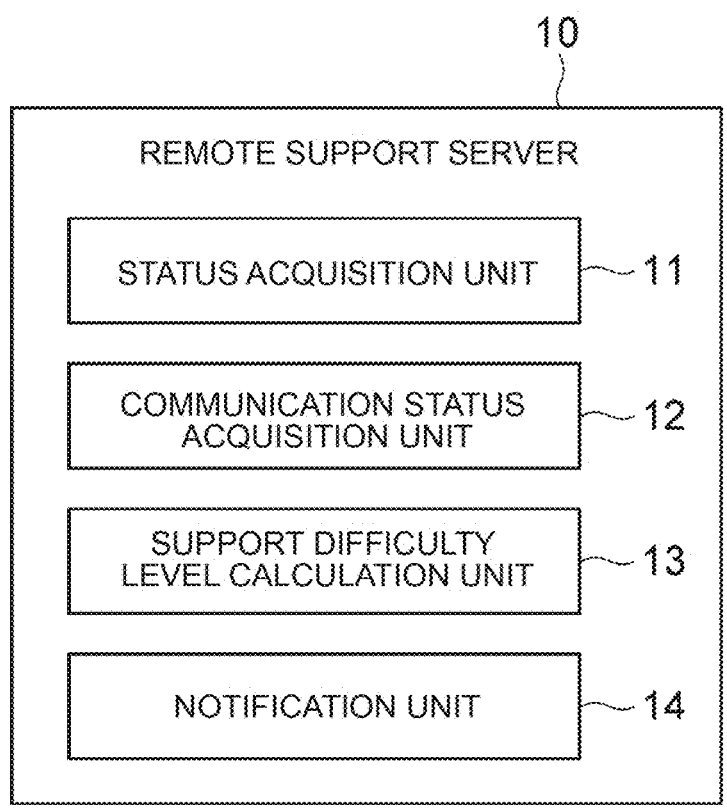
FIG. 3 is a block diagram of the functional configuration of the remote support server shown in FIG. 1.

Next, the functional configuration of the remote support server 10 will be described. FIG. 3 is a block diagram of the functional configuration of the remote support server 10. As shown in FIG. 3, the remote support server 10 includes a status acquisition unit 11, a communication state acquisition unit 12, a support difficulty level calculation unit 13, and a notification unit 14.

The status acquisition unit 11 acquires the support status of the remote operator R based on the information transmitted from the operator interface 3. The support status is the current status of the remote operator R in charge of remote support. The support status includes the biological information of the remote operator R, the work status of the remote operator R, and the number of mobile objects supported by the remote operator R.

The status acquisition unit 11 acquires biological information (hereinafter simply referred to as "biological information") of the remote operator R based on the detection result of the operator monitoring sensor 34. The biological information of the remote operator R includes, for example, the line of sight of the remote operator R, the heart rate of the remote operator R, the body temperature of the remote operator R, and the like.

The status acquisition unit 11 acquires the work status of the remote operator R (hereinafter simply referred to as "work status") based on the information transmitted from the operator interface 3. The work status is the degree of busyness of the remote operator R at present. The work situation is, for example, a situation in which the remote operator R is coping with troubles of another mobile object 2, a situation in which the remote operator R is temporarily providing remote support to the other mobile object 2, or a situation in which the remote operator R is waiting (free state) and the like. The work status may include the cumulative work time of the remote operator R and the like.

Based on the information transmitted from the operator interface 3, the status acquisition unit 11 acquires the number of supported mobile objects 2 assigned to the remote operator R (hereinafter simply referred to as "supported number"). The number of supported vehicles may be updated at any time.

The communication state acquisition unit 12 acquires the communication state between the remote support server 10 and the mobile object 2 (hereinafter simply referred to as "communication state"). The communication state acquisition unit 12 acquires the communication state using various known techniques.

The support difficulty level calculation unit 13 calculates the assistance difficulty level of the remote operator R based on the biometric information, the work status, the support status including the number of support machines, and the communication status. The support difficulty level is a level of difficulty for the mobile object 2 to receive remote support from the remote operator R. The larger the support difficulty level, the more difficult it is for the mobile object 2 to receive remote support from the remote operator R. Here, the difficulty level of support for one remote operator R will be explained. The support difficulty level calculation unit 13 calculates a plurality of indicators representing each of the biometric information, the work status, the number of support machines, and the communication status as the support difficulty level.

The support difficulty level calculation unit 13 calculates a first indicator X1 (see FIG. 4) representing biometric information. The support difficulty level calculation unit 13 determines the physiological condition of the remote operator R based on the biological information. The physiological state of the remote operator R includes, for example, the remote operator's R consciousness level and the remote operator's R concentration level. For example, when the remote operator R is in an unconscious state or in a dozing state (with a low level of consciousness), the support difficulty level calculation unit 13 calculates "high" as the first indicator X1. For example, when the remote operator R is distracted (the concentration level is low), the support difficulty level calculation unit 13 calculates "medium" as the first indicator X1. For example, when the remote operator R is gazing at the monitor 31 (the concentration level is high), the support difficulty level calculation unit 13 calculates "low" as the first indicator X1. In this embodiment, the first indicator X1 is, for example, "middle".

The support difficulty level calculation unit 13 calculates a second indicator X2 (see FIG. 4) representing the work situation. For example, when the remote operator R is coping with the trouble of the other mobile object 2, the support difficulty level calculation unit 13 calculates "high" as the second indicator X2. For example, when the remote operator R is temporarily providing remote support to another mobile object 2, the support difficulty level calculation unit 13 calculates "medium" as the second indicator X2. For example, when the remote operator R is on standby, the support difficulty level calculation unit 13 calculates "low" as the second indicator X2. In this embodiment, the second indicator X2 is, for example, "high".

The support difficulty level calculation unit 13 calculates a third indicator X3 (see FIG. 4) representing the number of devices supported by the remote operator R. For example, when the number of vehicles to be supported is equal to or greater than the first threshold, the support difficulty level calculation unit 13 calculates "high" as the third indicator X3. For example, when the number of vehicles to be supported is smaller than the first threshold and equal to or greater than the second threshold, the support difficulty level calculation unit 13 calculates "medium" as the third indicator X3. For example, when the number of vehicles to be supported is smaller than the second threshold, the support difficulty level calculation unit 13 calculates "low" as the third indicator X3. Each of the first threshold and the second threshold is determined in advance based on, for example, the environmental conditions in which the mobile object 2 is located. In this embodiment, the third indicator X3 is, for example, "high".

The support difficulty level calculation unit 13 calculates a fourth indicator X4 (see FIG. 4) representing the communication state. For example, when there is a communication failure, the support difficulty level calculation unit 13 calculates "high" as the fourth indicator X4. A communication failure is a state in which communication between the remote support server 10 and the mobile object 2 is impossible. For example, when the communication state is poor, the support difficulty level calculation unit 13 calculates "medium" as the fourth indicator X4. A bad communication state is a state in which the signal strength is equal to or less than a predetermined threshold. For example, when the communication state is good, the support difficulty level calculation unit 13 calculates "low" as the fourth indicator X4. A good communication state is a state in which the signal strength is greater than a predetermined threshold. The threshold regarding the communication state is a predetermined value. In this embodiment, the fourth indicator X4 is, for example, "low".

Figure 4:
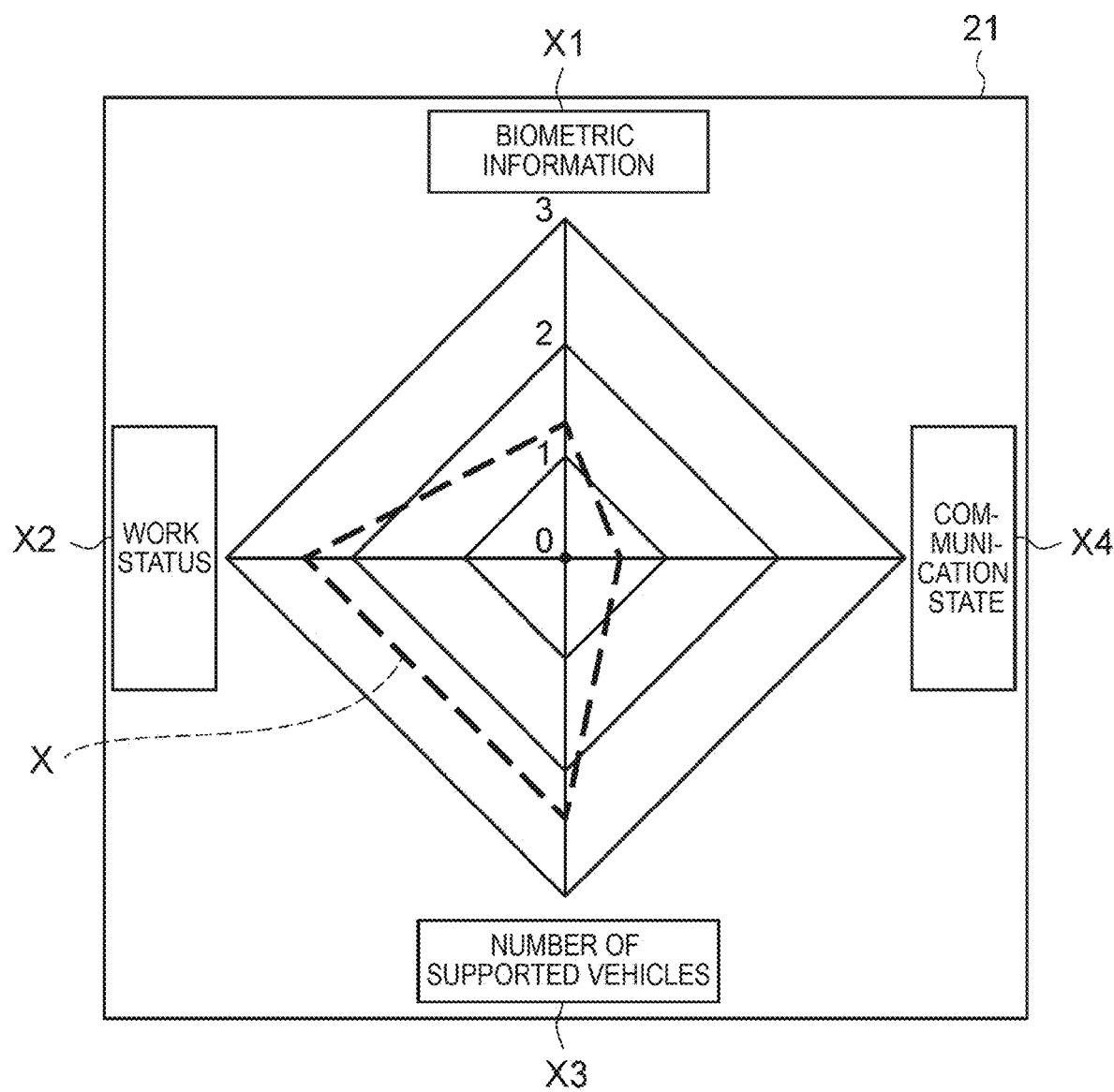
FIG. 4 is a diagram showing assistance difficulty levels displayed on the mobile display device shown in FIG. 1.

The notification unit 14 notifies the mobile object 2 of the assistance difficulty level. The notification unit 14 displays the assistance difficulty level on the display device of the mobile object 2. FIG. 4 is a diagram showing the display device of the mobile object 2. As shown in FIG. 4, the notification unit 14 notifies each indicator X1, X2, X3, X4 of the support difficulty level X. The notification unit 14 displays the support difficulty level X in the form of a radar chart on the display device 21. A radar chart has a plurality of evaluation axes. The radar chart shown in FIG. 4 has four evaluation axes. The radar chart shown in FIG. 4 presents a square shape. Each evaluation axis of the radar chart corresponds to each indicator X1, X2, X3, X4. Each evaluation axis of the radar chart has "0", "1", "2" and "3" as scales.

In the radar chart, each indicator X1, X2, X3, X4 is represented on each evaluation axis. For example, since the first indicator X1 is "middle", the first indicator X1 is located between the scale "1" and the scale "2". For example, since the second indicator X2 is "high", the second indicator X2 is located between the scale "2" and the scale "3". For example, since the third indicator X3 is "high", the third indicator X3 is located between the scale "2" and the scale "3". For example, since the fourth indicator X4 is "low", the fourth indicator X4 is located between the scale ["2"] "0" and the scale ["3"] "1". In the radar chart, the support difficulty level X is a polygonal area formed by connecting the indicators X1, X2, X3, and X4. There is a tendency that the larger the area of the support difficulty level X, the larger the support difficulty level.

Figure 5:
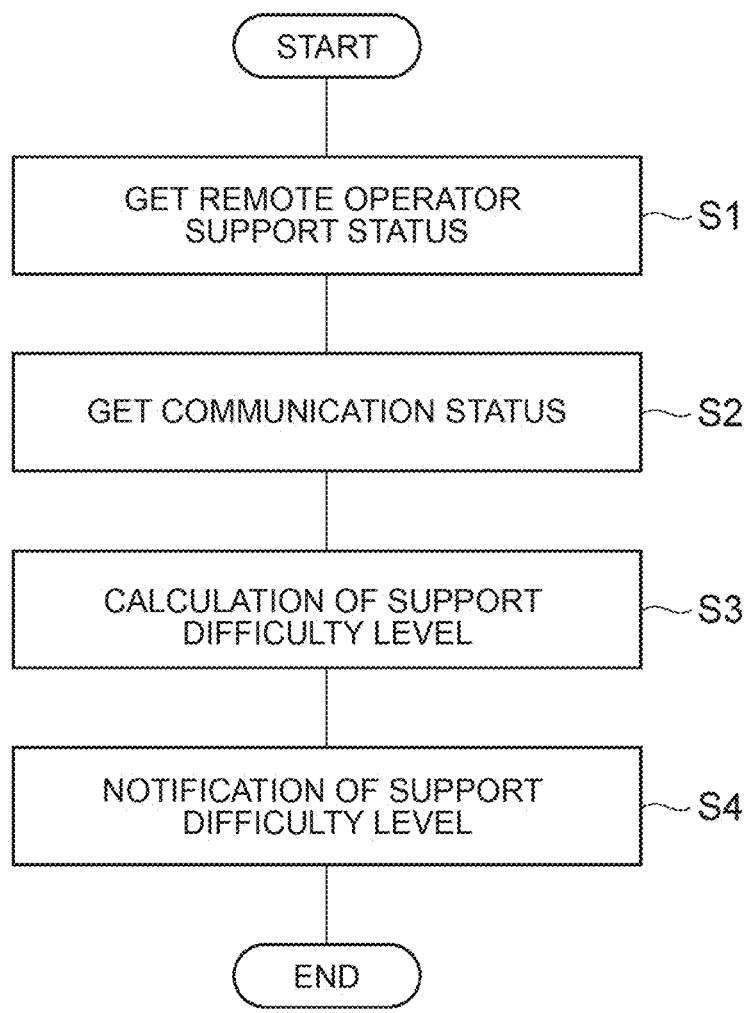
FIG. 5 is a flowchart showing processing by the remote assistance server shown in FIG. 1.

Next, processing by the remote support server 10 in the remote support system 1 of this embodiment will be described. FIG. 5 is a flowchart showing processing by the remote support server 10. As shown in FIG. 5, the remote support server 10 acquires the support status of the remote operator R in S1. Subsequently, the remote support server 10 acquires the communication state between the remote support server 10 and the mobile object 2 in S2. Subsequently, the remote support server 10 calculates the assistance difficulty level of the remote operator R in S3. Subsequently, the remote support server 10 notifies the support difficulty level in S4.

As described above, the remote support system 1 calculates the support difficulty level X of the remote operator R based on the work status of the remote operator R, and notifies the mobile object 2 of the support difficulty level X. Thereby, the operator of the mobile object 2 can grasp the support difficulty level X. Therefore, according to the remote support system 1, it becomes possible for the mobile object 2 side to grasp the support difficulty level. Furthermore, when the support difficulty level X is relatively high and, for example, when the mobile object 2 is located in a relatively complicated environment (when automatic driving is not safe), the operator of the mobile object 2, it can be determined that the mobile object 2 is operated by itself.

The status acquisition unit 11 acquires biological information of the remote operator R based on the detection result of the operator monitoring sensor 34 of the operator interface 3. The support difficulty level calculation unit 13 calculates the assistance difficulty level based on the biometric information. This makes it possible to more appropriately calculate the degree of difficulty in assisting the remote operator R.

The status acquisition unit 11 acquires the number of supported mobile objects 2 assigned to the remote operator R based on the information transmitted from the operator interface 3. The support difficulty level calculation unit 13 calculates the assistance difficulty level based on the number of vehicles to be supported. This makes it possible to more appropriately calculate the degree of difficulty in assisting the remote operator R.

The support difficulty level calculation unit 13 calculates the support difficulty level X by using indexes X1, X2, X3, and X4 representing the work status, biometric information, the number of units to be supported, and the communication status. The notification unit 14 notifies each of the indicators X1, X2, X3, and X4. As a result, the operator of the mobile object 2 can grasp the support difficulty level X in detail.

The notification unit 14 displays the support difficulty level X in the form of a radar chart on the display device of the mobile object 2. As a result, the operator of the mobile object 2 can grasp the support difficulty level X more easily.

Although the embodiments of the present disclosure have been described above, the present disclosure is not limited to the above-described embodiments. The present disclosure can be embodied in various forms with various modifications and improvements based on the knowledge of those skilled in the art, including the embodiments described above.

Although an example in which the mobile object 2 is a passenger car has been shown, the mobile object 2 may be, for example, a route bus. If the mobile object 2 is a route bus, the mobile object 2 may receive remote support from a plurality of remote support system 1. One remote support system 1 of the plurality of remote support system 1, like the remote support system 1 of the embodiment, is a system for performing the remote support for the mobile object 2 when the mobile object 2 is located in a relatively complex environment. The remote operator R in this case is also called a remote supporter. The other remote support system 1 of the plurality of remote support system 1 is a system for providing remote support to the plurality of mobile objects 2 when it is necessary to adjust the operation status of the plurality of mobile objects 2. For example, when the operation time of the mobile object 2 or the distance between the mobile objects 2 is abnormal, remote support is provided to the mobile object 2. The remote operator R in this case is also called an operation manager. In this case, at least the support difficulty level calculation unit 13 and the notification unit 14 of the remote support server 10 are mounted on the mobile object 2.

Figure 6:
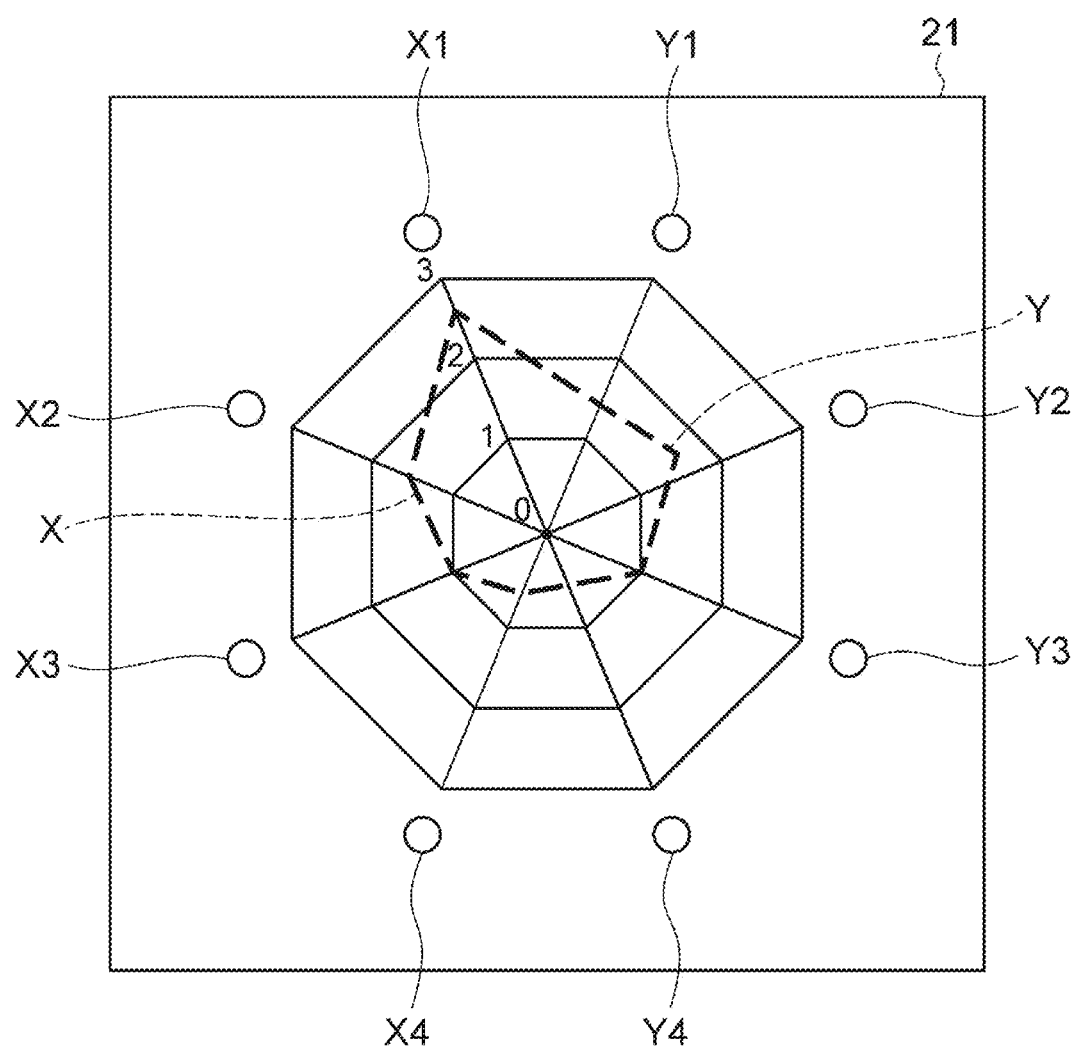
FIG. 6 is a diagram showing a modification of assistance difficulty levels displayed on the mobile display device shown in FIG. 1.

FIG. 6 is a diagram showing a modification of the assistance difficulty level displayed on the display device 21 of the mobile object 2. As shown in FIG. 6, the notification unit 14 may display both the support difficulty level X of the remote supporter and the support difficulty level Y of the operation manager as one radar chart. The support difficulty level Y includes a first indicator Y1 representing the biological information of the operation manager, a second indicator Y2 representing the work status of the operation manager, a third indicator Y3 representing the number of vehicles supported by the operation manager, and a fourth indicator Y4 representing the communication state.

The support difficulty level calculation unit 13 may calculate the support difficulty level X as a single index reflecting all of the work status of the remote operator R, the biometric information of the remote operator R, the number of mobile objects supported by the remote operator R, and the communication state. The support difficulty level calculation unit 13 integrates the indicators X1, X2, X3, and X4 into one index. The support difficulty level calculation unit 13 calculates the support difficulty level X based on, for example, the formula $X=w1 \times x1+w2 \times x2+w3 \times x3+w4 \times x4$. x1, x2, x3, and x4 are numerical indicators X1, X2, X3, and X4. w1, w2, w3, and w4 are weighting coefficients corresponding to the indicators X1, X2, X3, and X4. Similarly, the support difficulty level calculation unit 13 may calculate the support difficulty level Y as one index.

Figure 7A:
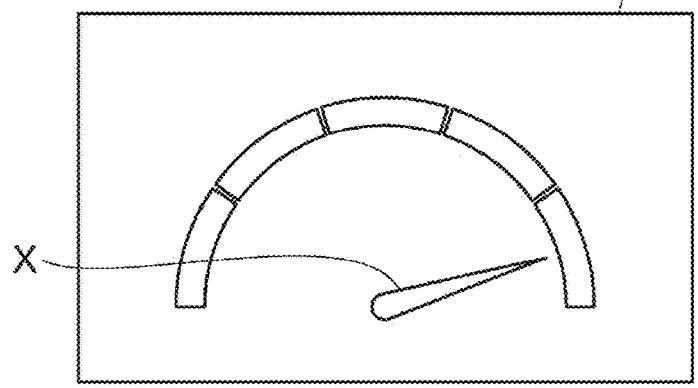
FIG. 7A is a diagram showing a modification of assistance difficulty levels displayed on the mobile display device shown in FIG. 1.
Figure 7B:
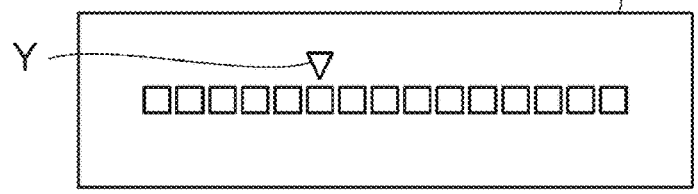
FIG. 7B is a diagram showing a modification of assistance difficulty levels displayed on the mobile display device shown in FIG. 1.

The notification unit 14 may perform notification of one of the indicators described above. As shown in FIG. 7A, the notification unit 14 may display the support difficulty level X calculated as one index as a bar ranging from 0% to 100%. Thereby, the operator of the mobile object 2 can easily grasp the support difficulty level X. As shown in FIG. 7B, the notification unit 14 may display the support difficulty level Y calculated as one index as a bar ranging from 0% to 100%. The notification unit 14 may display the support difficulty level X and the support difficulty level Y in separate areas of the display device 21.

Figure 7C:
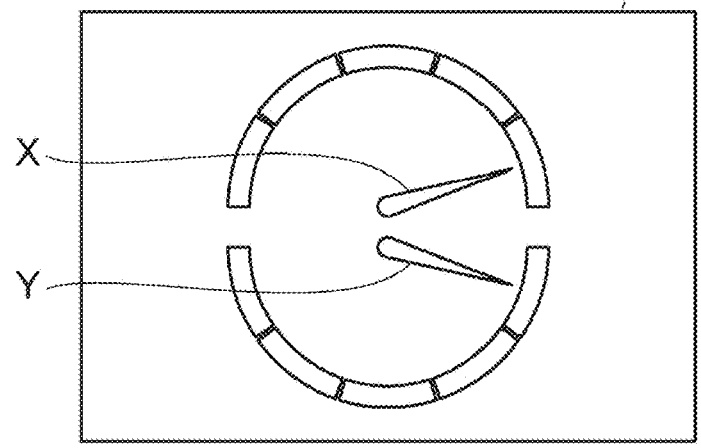
FIG. 7C is a diagram showing a modification of the assistance difficulty level displayed on the mobile display device shown in FIG. 1.
Figure 7D:
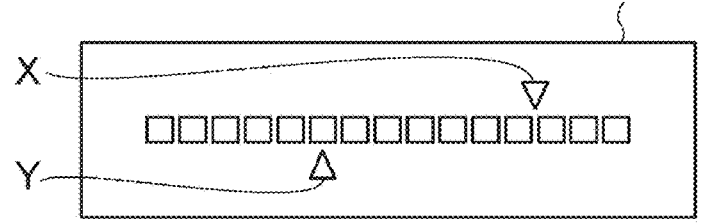
FIG. 7D is a diagram showing a modification of the assistance difficulty level displayed on the display device of the mobile object shown in FIG. 1.

As shown in FIG. 7C or FIG. 7D, the notification unit 14 may display both the support difficulty level X calculated as one index and the support difficulty level Y calculated as one index in the same area on the display device 21.

The support difficulty level calculation unit 13 may calculate the support difficulty level X of each of a plurality of remote operators R (remote supporters) who provide remote support for one mobile object 2 as one index. The support difficulty level calculation unit 13 may calculate the support difficulty level Y of each of a plurality of remote operators R (operation managers) who provide remote support for one mobile object 2 as one index.

The support difficulty level calculation unit 13 may calculate a further subdivided index for the biometric information. For example, the support difficulty level calculation unit 13 may calculate indices representing the body temperature of the remote operator R and the concentration level of the remote operator R, respectively. The support difficulty level calculation unit 13 may calculate a subdivided index for the work situation. For example, the support difficulty level calculation unit 13 may calculate indices representing the situation in which the remote operator R is coping with troubles of the other mobile object 2 and the cumulative work time of the remote operator R, respectively. The notification unit 14 may display these subdivided indicators in the form of a radar chart on the display device 21 of the mobile object 2.

The support difficulty level calculation unit 13 does not need to base the calculation of the support difficulty level on at least one of the biometric information, the number of support devices, and the communication state. The support difficulty level calculation unit 13 may calculate the assistance difficulty level based on the work situation.

The notification unit 14 may display the support difficulty level as a numerical value or characters on the display device 21. The notification unit 14 may notify the support difficulty level by voice through the speaker of the mobile object 2 or the like.

The mobile object 2 may be, for example, a robot or the like.

The remote operator R does not have to input the number of supported mobile objects 2 assigned to the remote operator R into the input device 33. In this case, the shift table of the remote operator R and the like may be stored in the storage unit 35 in advance. The status acquisition unit 11 may acquire the number of support mobile objects 2 assigned to the remote operator R based on the shift table stored in the storage unit 35 (information transmitted from the operator interface 3).

What is claimed is:

1. A remote support system comprising:
   a plurality of mobile objects each including a display;
   an operator interface configured to be operated by a remote operator, the operator interface including a touch panel and a first monitoring camera; and
   a server configured to communicate with the plurality of mobile objects and the operator interface, the server including a processor, wherein
   the operator interface is configured to
      acquire a first image of a face of the remote operator from the first monitoring camera,
      receive an input of support information by the remote operator via the touch panel, wherein the support information includes
         a number of the plurality of mobile objects assigned to the remote operator, and
         a support instruction for remotely supporting the plurality of mobile objects, and
      transmit the first image and the support information to the server, and the processor is configured to
      receive the first image and the support information from the operator interface,
      calculate a first support difficulty level value based on the number of the plurality of mobile objects included in the received support information,
      calculate a second support difficulty level value based on contents of the support instruction included in the received support information,
      calculate a third support difficulty level value based on the received first image, and
      send a first command to a target mobile object of the plurality of mobile objects to cause the display of the target mobile object to display a radar chart, wherein the first support difficulty level value, the second support difficulty level value, and the third support difficulty level value are plotted on respective axes of the radar chart.

2. The remote support system according to claim 1, wherein
   each of the plurality of mobile objects further includes a second monitoring camera that acquires a second image of an outside environment of a corresponding mobile object of the plurality of mobile objects,
   the operator interface further includes a monitor, and
   the processor is further configured to send a second command to the operator interface to cause the monitor to display the second image to prompt the remote operator to remotely support the corresponding mobile object based on the second image.

3. The remote support system according to claim 1, wherein the processor is further configured to determine whether the number of the plurality of mobile objects is equal to or greater than a predetermined number, wherein
   the processor sets the first support difficulty level value to be higher when the number of the plurality of mobile objects is equal to or greater than the predetermined number than when the number of the plurality of mobile objects is less than the predetermined number.

4. The remote support system according to claim 1, wherein the processor is further configured to
   determine whether the support information indicates that the remote operator is currently remotely supporting a non-target mobile object of the plurality of mobile objects, wherein the non-target mobile object is different from the target mobile object, and
   set the second support difficulty level value to be higher when the support information indicates that the remote operator is currently remotely supporting the non-target mobile object than when the support information indicates that the remote operator is currently not remotely supporting the non-target mobile object.

5. The remote support system according to claim 2, wherein the processor is further configured to
   detect a line of sight of the remote operator from the acquired first image,
   determine whether the line of sight is directed to the monitor, and
   set the third support difficulty level value to be higher when the line of sight is directed to the monitor than when the line of sight is not directed to the monitor.

* * * * *